United States Patent
Asahi et al.

(10) Patent No.: US 6,738,028 B2
(45) Date of Patent: May 18, 2004

(54) MULTI-DISPLAY SYSTEM AND CURSOR CONTROLLING METHOD THEREFOR

(75) Inventors: Hiroyuki Asahi, Kobe (JP); Naoko Sakamoto, Akashi (JP); Yoichi Kawabata, Kobe (JP); Hitomi Fujisaki, Kobe (JP); Toshiharu Kitagawa, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 223 days.

(21) Appl. No.: 09/938,995

(22) Filed: Aug. 24, 2001

(65) Prior Publication Data

US 2002/0075199 A1 Jun. 20, 2002

(30) Foreign Application Priority Data

Dec. 14, 2000 (JP) .................................. 2000-379863

(51) Int. Cl.⁷ .................................................. G09G 5/08
(52) U.S. Cl. ...................................... 345/1.1; 345/157
(58) Field of Search ............................... 345/145, 157, 345/2, 1.1, 3, 118, 162, 146, 160, 709, 156, 167, 169

(56) References Cited

U.S. PATENT DOCUMENTS

| | | | | | |
|---|---|---|---|---|---|
| 5,047,754 A | * | 9/1991 | Akatsuka et al. | ........... | 345/163 |
| 5,298,890 A | * | 3/1994 | Kanamaru et al. | .......... | 345/157 |
| 5,694,150 A | * | 12/1997 | Sigona et al. | ................ | 345/856 |
| 5,838,300 A | * | 11/1998 | Takagi et al. | ................ | 345/700 |
| 5,933,843 A | * | 8/1999 | Takai | .......................... | 715/526 |
| 6,542,148 B1 | * | 4/2003 | Tanaka et al. | ............... | 345/157 |
| 2002/0075230 A1 | * | 6/2002 | Okuda et al. | ................ | 345/157 |
| 2003/0080940 A1 | * | 5/2003 | Kawasome | .................. | 345/157 |

* cited by examiner

*Primary Examiner*—Vijay Shankar
*Assistant Examiner*—Nitin Patel
(74) *Attorney, Agent, or Firm*—Snell & Wilmer, LLP

(57) ABSTRACT

A multi-display system includes: first display means and second display means, wherein a cursor is displayed at a first position on the first display means; cursor position conversion means for converting the first position on the first display means at which the cursor is displayed to a second position on the second display means; and cursor display means for displaying a reference cursor at the second position on the second display means as converted by the cursor position conversion means. The first position is converted to the second position by the cursor position conversion means in such a manner that the reference cursor displayed at the second position on the second display means uniquely identifies the first position at which the cursor is displayed on the first display means.

16 Claims, 12 Drawing Sheets

FIG. 2
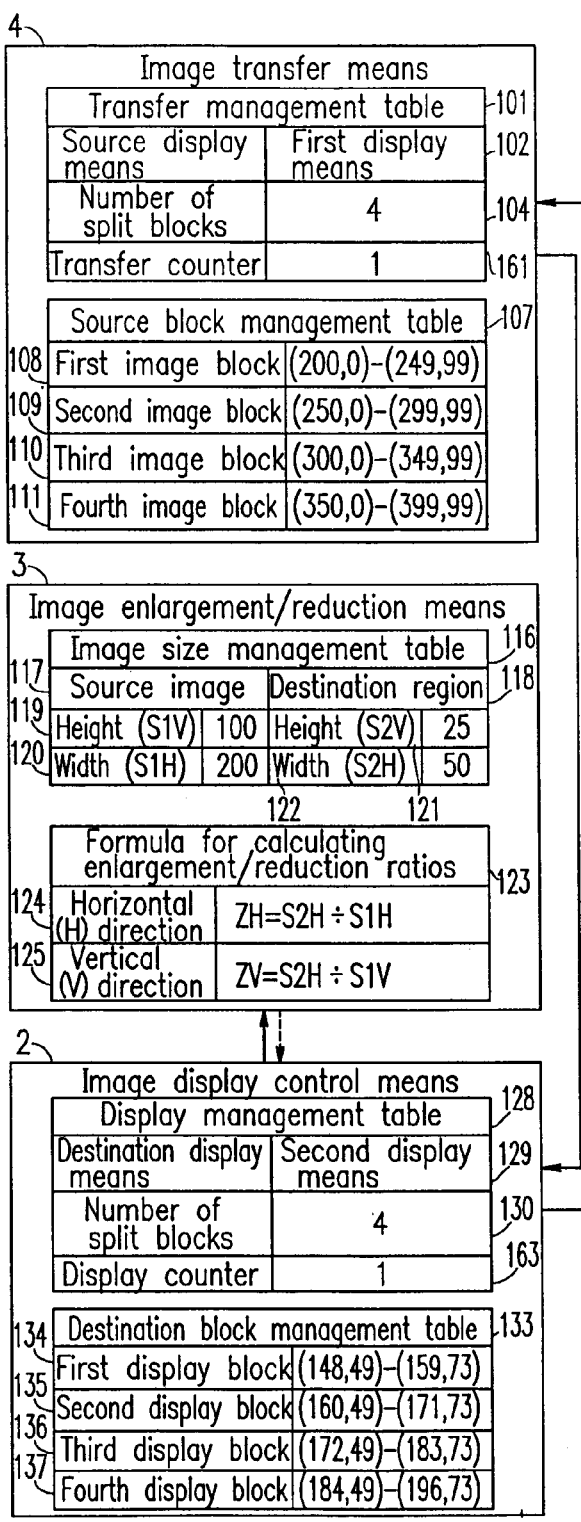
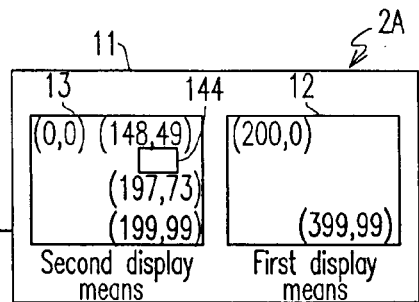
Image displayed on first display means 12
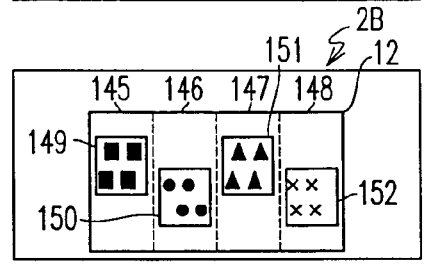
After transfer of first block
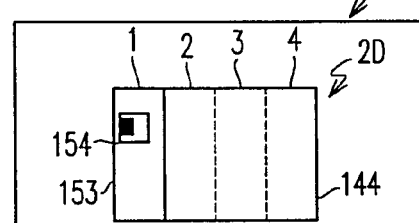
After transfer of second block
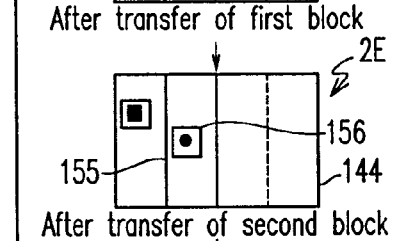
After transfer of third block
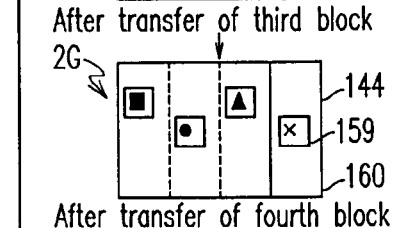
After transfer of fourth block
Image displayed on second display means 13

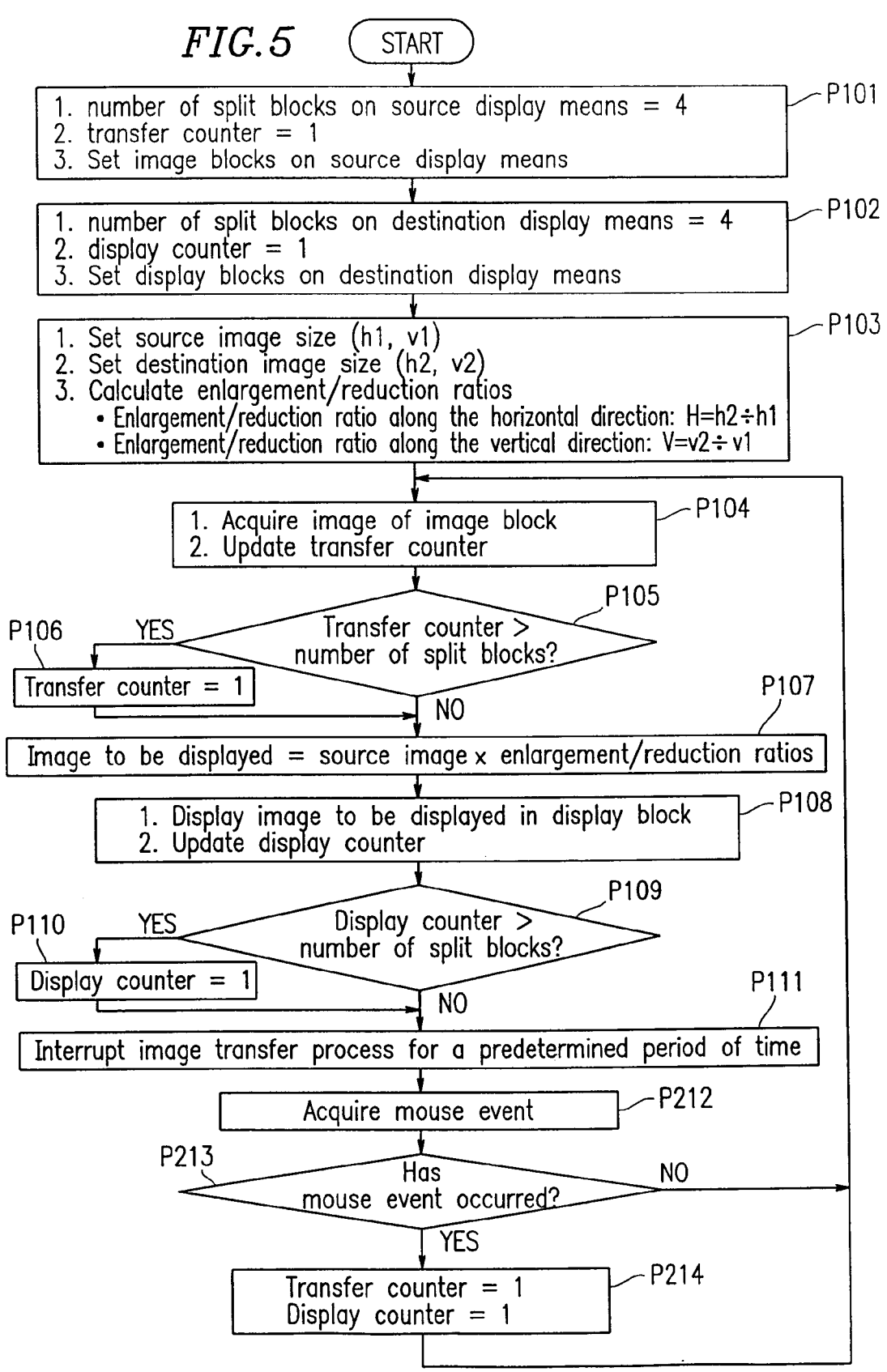

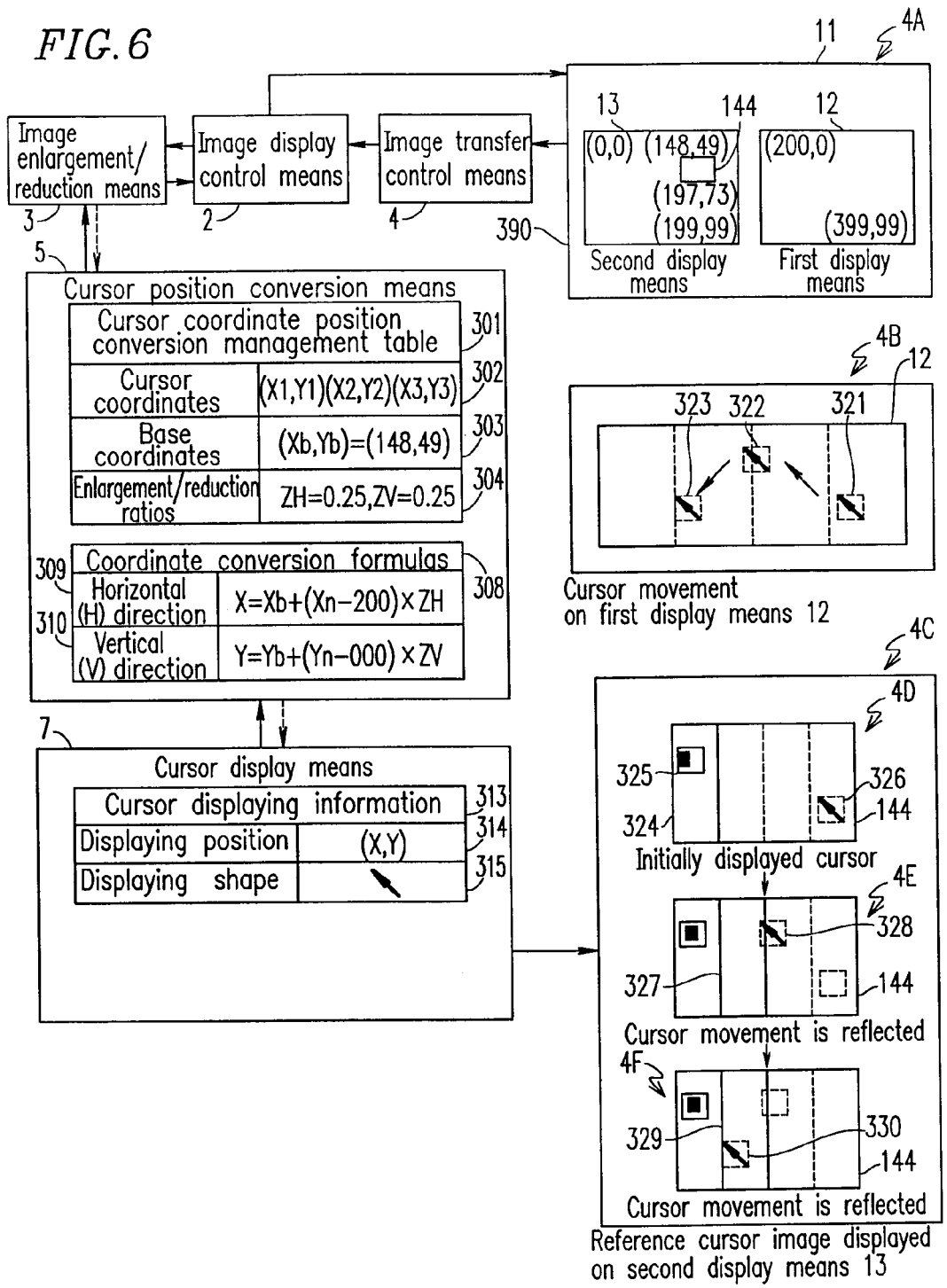

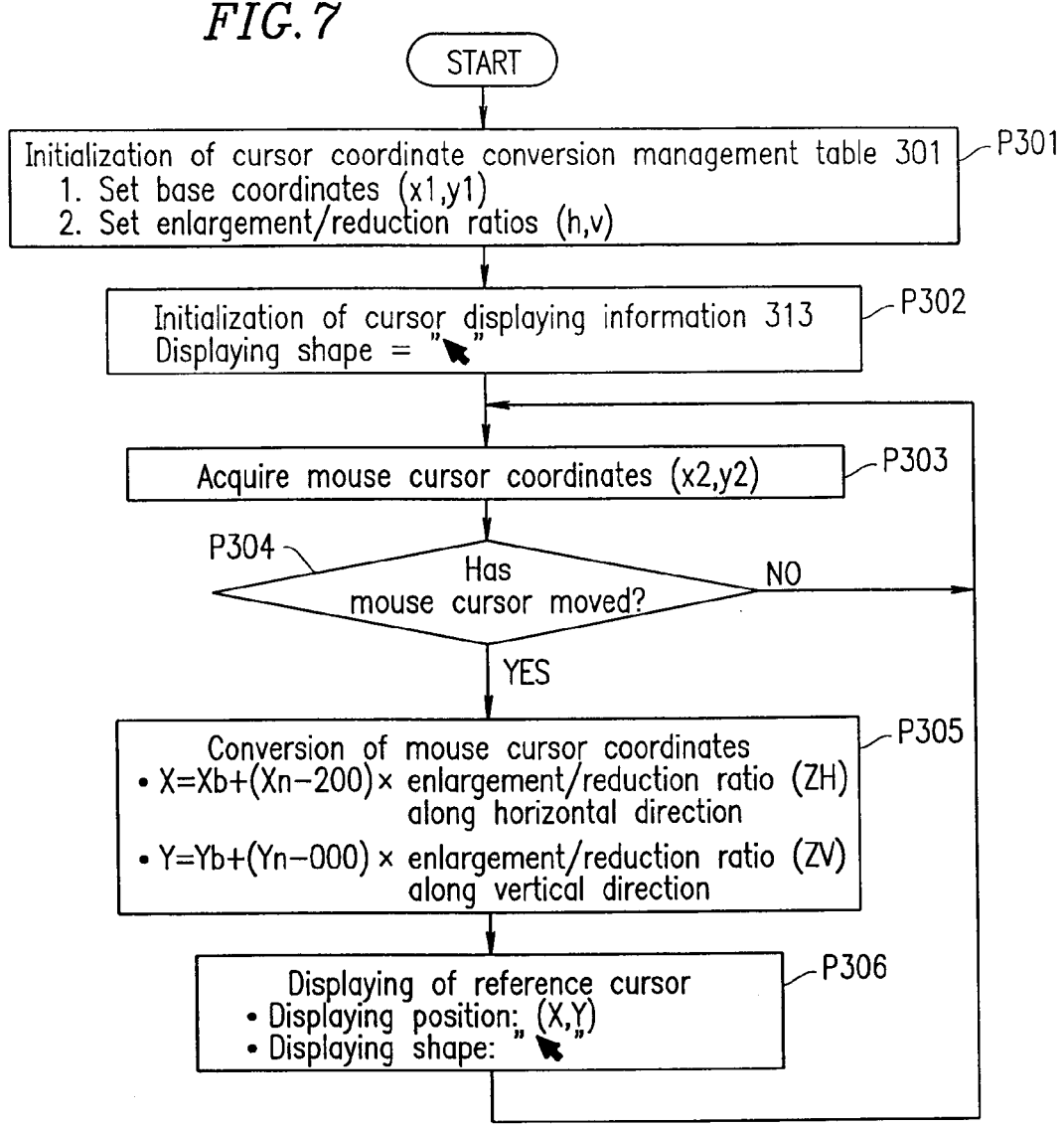

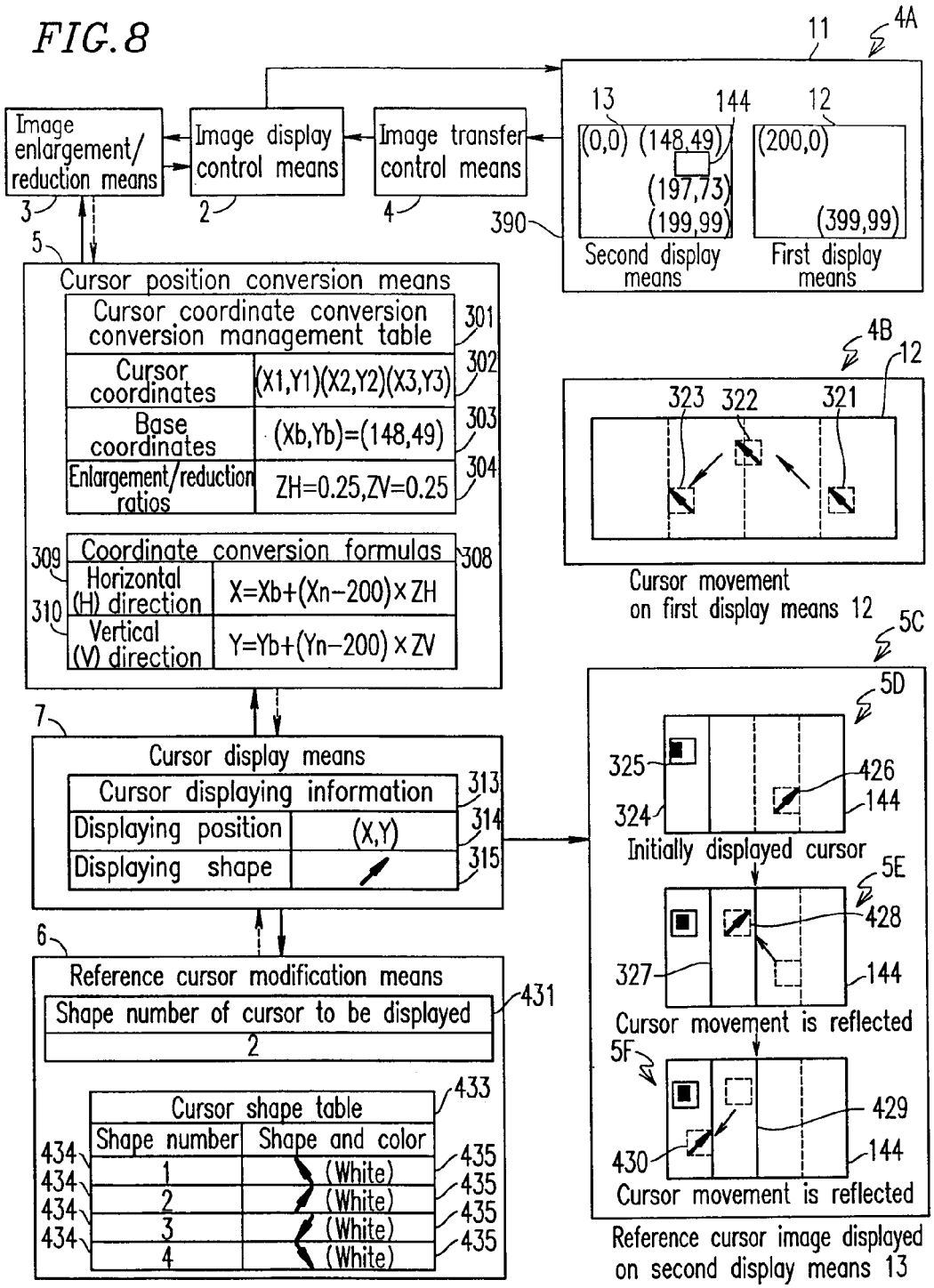

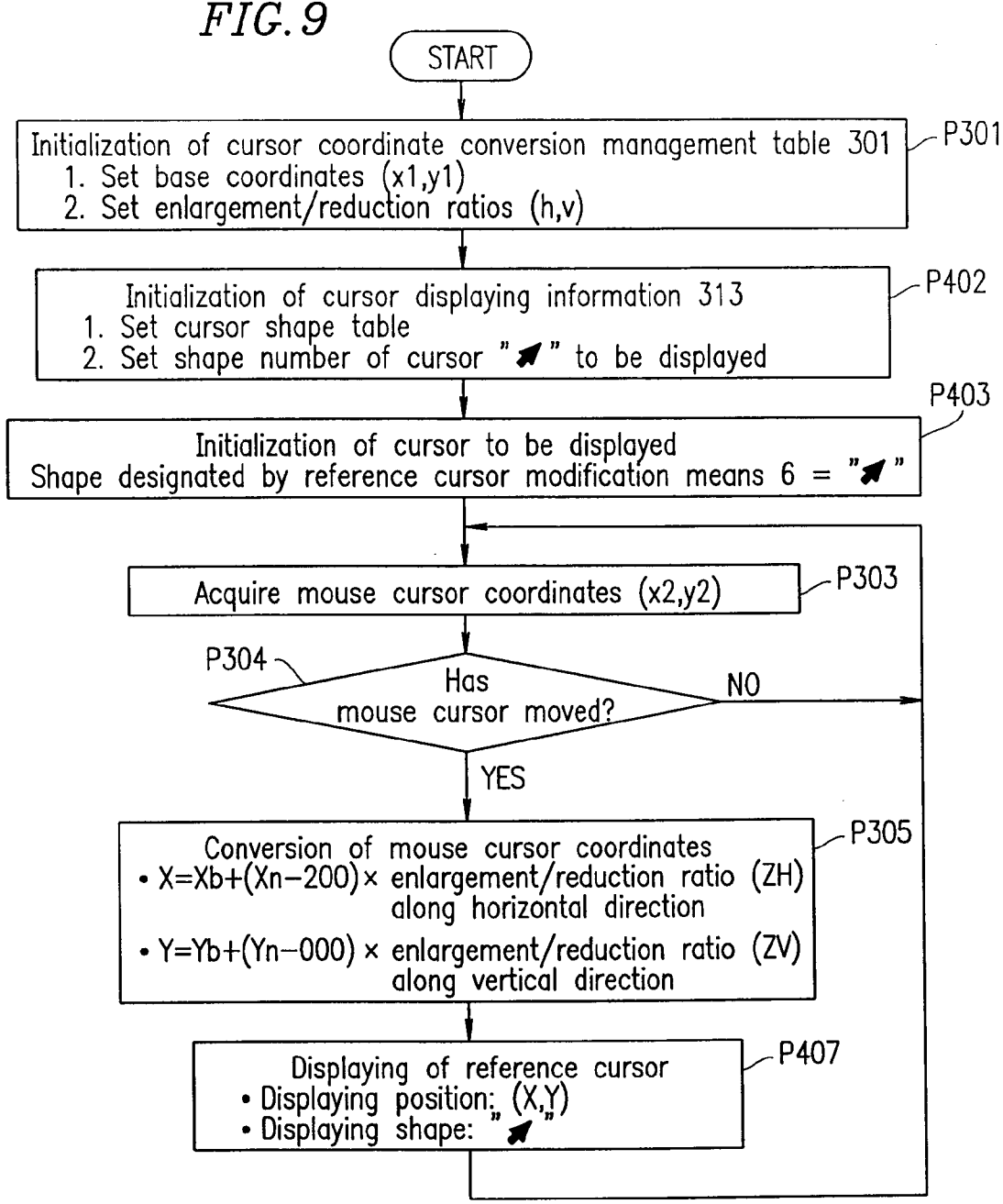

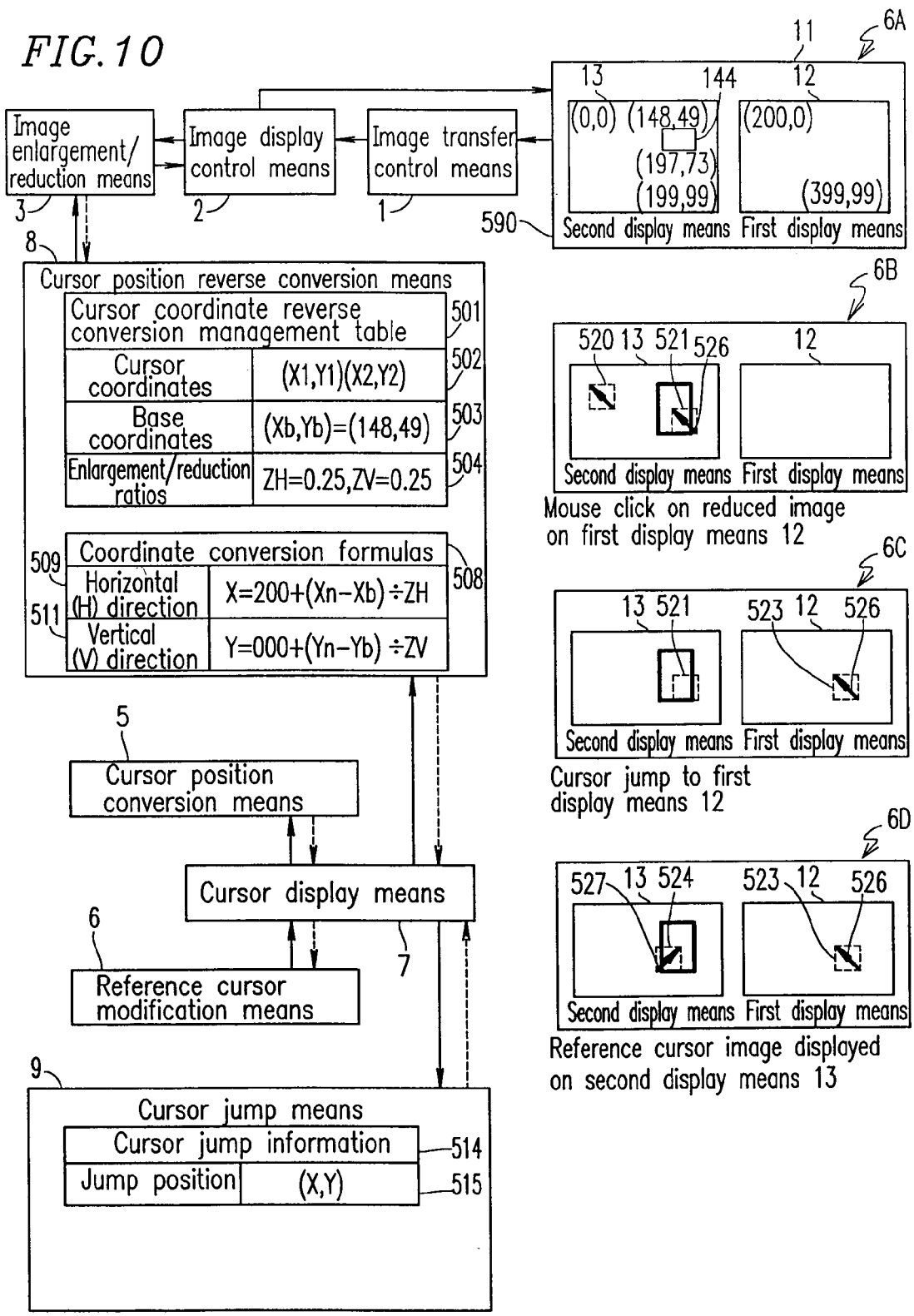

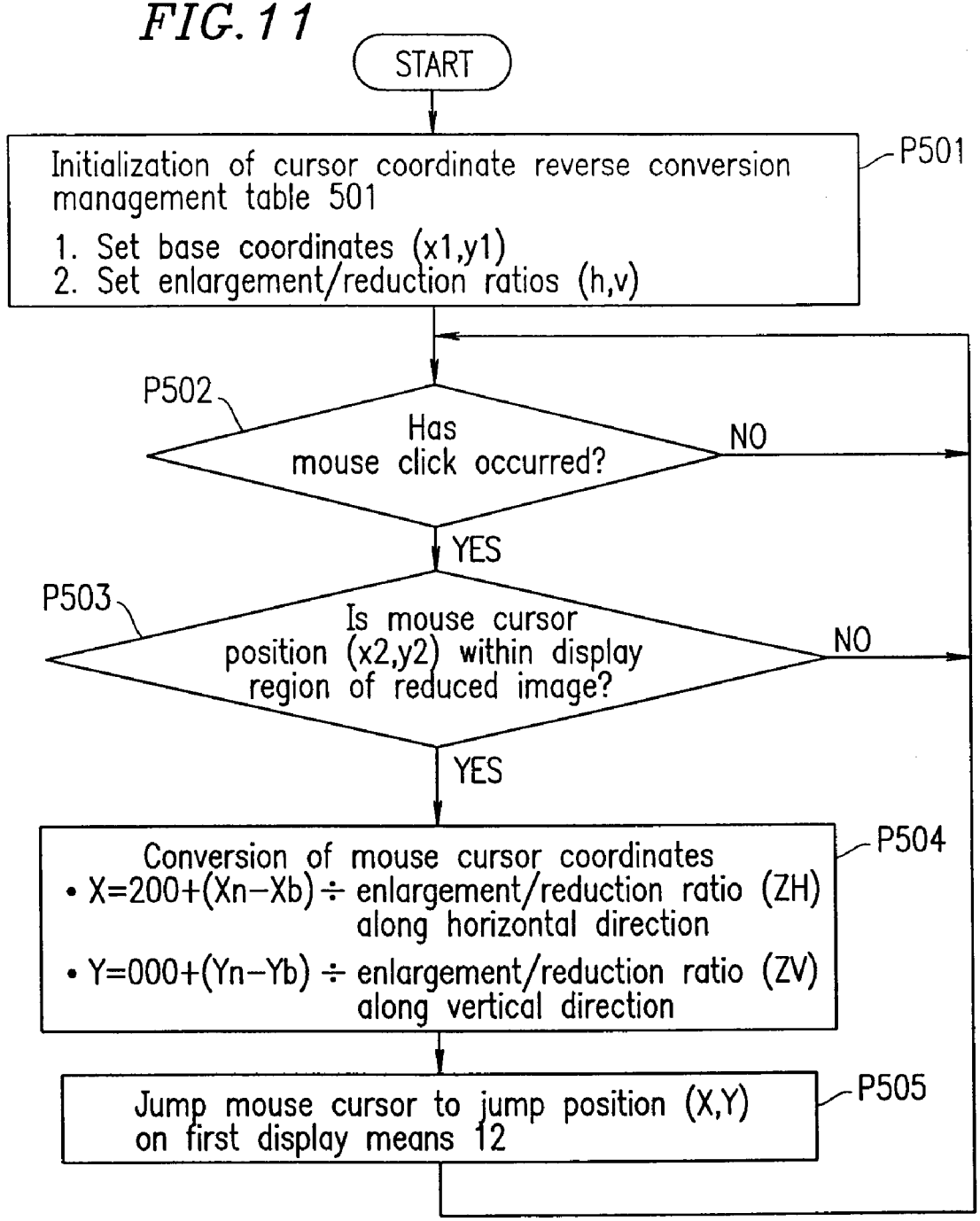

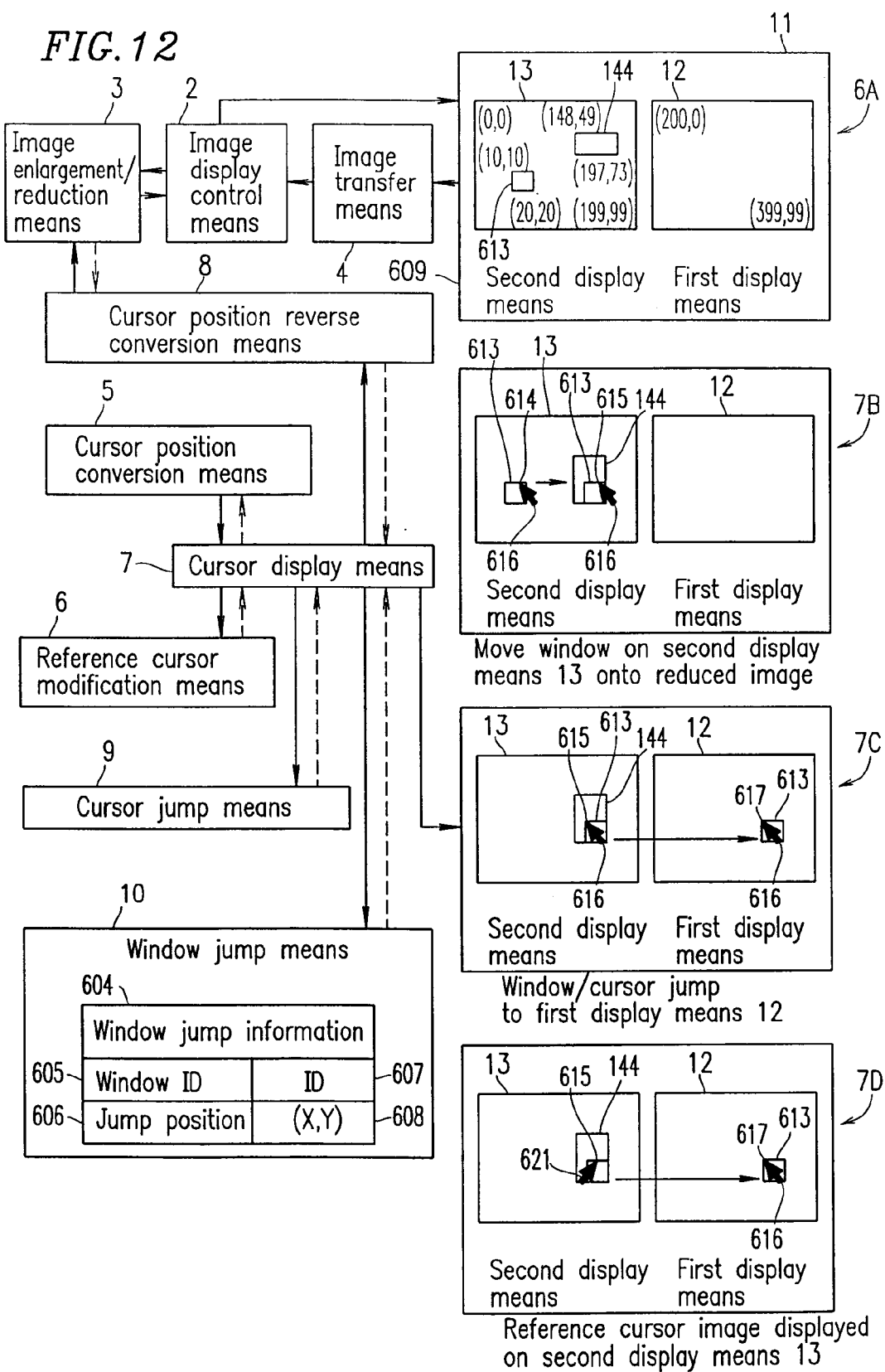

MULTI-DISPLAY SYSTEM AND CURSOR CONTROLLING METHOD THEREFOR

BACKGROUND OF THE INVENTION

1. Field of the Invention:

The present invention relates to transfer of images to be displayed, which may occur among a number of display means in a multi-display system.

2. Description of the Related Art:

In a conventional multi-display system, any transfer of display images among a number of display means is made by utilizing specially-designed hardware.

In the case where an image is to be transferred in an enlarged or reduced format among a number of display means, the image of a cursor is also enlarged or reduced so as to properly account for part of an entire image (which is synthesized with another image) to be transferred.

However, such a conventional multi-display system has the problem of increased device size and increased cost due to the use of the aforementioned specially-designed hardware.

On the other hand, if transfer of images among a number of display means is performed by utilizing software means instead of specially-designed hardware, there is a problem in that a substantial burden is laid on the system to slow down the process speed of the overall system because, in general, display images entail a large amount of data.

There is also a problem in that, when the image of a cursor is enlarged or reduced to become part of an entire image which is synthesized with another image to be transferred, the cursor position on the destination display means may be shifted from the intended position, and the cursor itself may become harder to visually recognize.

Furthermore, when two users are seated across from each other, with their respective display means placed "back to back" (i.e., so that each user can properly see their own display means), for example, there is a problem in that a user facing one of the display means cannot recognize the position of the cursor which is displayed on the other display means.

SUMMARY OF THE INVENTION

In one aspect of the present invention, there is provided a multi-display system comprising: first display means and second display means, wherein a cursor is displayed at a first position on the first display means; cursor position conversion means for converting the first position on the first display means at which the cursor is displayed to a second position on the second display means; and cursor display means for displaying a reference cursor at the second position on the second display means as converted by the cursor position conversion means, wherein the first position is converted to the second position by the cursor position conversion means in such a manner that the reference cursor displayed at the second position on the second display means uniquely identifies the first position at which the cursor is displayed on the first display means.

In one embodiment of the invention, the second display means comprises a reference region containing the second position at which the reference cursor is displayed; and the first position is converted to the second position by the cursor position conversion means in such a manner that the second position in the reference region corresponds to the first position on the first display means.

In another embodiment of the invention, an angle between the first display means and the second display means is adjustable to any value.

In still another embodiment of the invention, the first display means and second display means are placed back-to-back.

In still another embodiment of the invention, the multi-display system further comprises reference cursor modification means for modifying at least one of color and shape of the reference cursor, wherein the cursor display means displays the reference cursor at the second position on the second display means in accordance with the at least one of color and shape as modified by the reference cursor modification means.

Alternatively, according to the present invention, there is provided a multi-display system comprising: first display means and second display means, wherein the second display means includes a reference region in which a cursor is displayed; cursor position reverse conversion means for converting a first position in the reference region at which the cursor is displayed to a second position on the first display means; and cursor jump means for causing the cursor displayed in the reference region to jump to the second position on the first display means as converted by the cursor position reverse conversion means.

In one embodiment of the invention, the multi-display system further comprises cursor display means for displaying a reference cursor at the first position after the cursor displayed in the reference region has jumped to the second position on the first display means.

In another embodiment of the invention, a window is displayed in the reference region, the multi-display system further comprising: window jump means for causing the window displayed in the reference region to jump to the second position on the first display means as converted by the cursor position reverse conversion means.

In another aspect of the present invention, there is provided a cursor controlling method for a multi-display system comprising: a first step of displaying a cursor at a first position on the first display means; a second step of converting the first position on the first display means at which the cursor is displayed to a second position on the second display means; and a third step of displaying a reference cursor at the second position on the second display means as converted by the second step, wherein the second step comprises converting the first position to the second position in such a manner that the reference cursor displayed at the second position on the second display means uniquely identifies the first position at which the cursor is displayed on the first display means.

In one embodiment of the invention, the second display means comprises a reference region containing the second position at which the reference cursor is displayed; and the second step comprises converting the first position to the second position in such a manner that the second position in the reference region corresponds to the first position on the first display means.

In another embodiment of the invention, an angle between the first display means and the second display means is adjustable to any value.

In still another embodiment of the invention, the first display means and second display means are placed back-to-back.

In still another embodiment of the invention, the method further comprises a fourth step of modifying at least one of color and shape of the reference cursor, wherein the third step comprises displaying the reference cursor at the second position on the second display means in accordance with the at least one of color and shape as modified by the fourth step.

Alternatively, according to the present invention, there is provided a cursor controlling method for a multi-display system comprising first display means and second display means, wherein the second display means includes a reference region in which a cursor is displayed, the method comprising: a first step of converting a first position in the reference region at which the cursor is displayed to a second position on the first display means; and a second step of causing the cursor displayed in the reference region to jump to the second position on the first display means as converted by the first step.

In one embodiment of the invention, the method further comprises a third step of displaying a reference cursor at the first position after the cursor displayed in the reference region has jumped to the second position on the first display means.

In another embodiment of the invention, a window is displayed in the reference region, the method further comprising: a third step of causing the window displayed in the reference region to jump to the second position on the first display means as converted by the first step.

Thus, the invention described herein makes possible the advantages of (1) providing a multi-display system which, when two users are seated across from each other with their respective display means placed "back to back" (i.e., so that each user can properly see their own display means), allows a user facing one of the display means to accurately recognize the position of the cursor which is displayed on the other display means; and (2) providing a cursor controlling method therefor.

These and other advantages of the present invention will become apparent to those skilled in the art upon reading and understanding the following detailed description with reference to the accompanying figures.

BRIEF DESCRIPTION OF THE DRAWINGS

FIG. 2 is a diagram illustrating a process of reducing and transferring an image displayed on a source display means to a specific region on a destination display means according to Example 1 of the present invention.

FIG. 5 is a flowchart illustrating an image redisplay process according to Example 2 of the present invention, which is performed in response to a mouse event during image transfer.

FIG. 6 is a diagram illustrating a process of displaying a mouse cursor image during image transfer according to Example 3 of the present invention.

FIG. 7 is a flowchart illustrating a display process for a mouse cursor image during image transfer according to Example 3 of the present invention.

FIG. 8 is a diagram illustrating a process of displaying a mouse cursor image on a destination display means according to Example 4 of the present invention.

FIG. 9 is a flowchart illustrating a display process for a reference mouse cursor according to Example 4 of the present invention.

FIG. 10 is a diagram illustrating a process of moving a mouse cursor between display means according to Example 5 of the present invention.

FIG. 11 is a flowchart illustrating a process of moving a mouse cursor between display means according to Example 5 of the present invention.

FIG. 12 is a flowchart illustrating another process of moving a mouse cursor between display means according to Example 6 of the present invention.

DESCRIPTION OF THE PREFERRED EMBODIMENTS

Hereinafter, the present invention will be described by way of illustrative examples, with reference to the accompanying figures.

EXAMPLE 1

Figure 1:
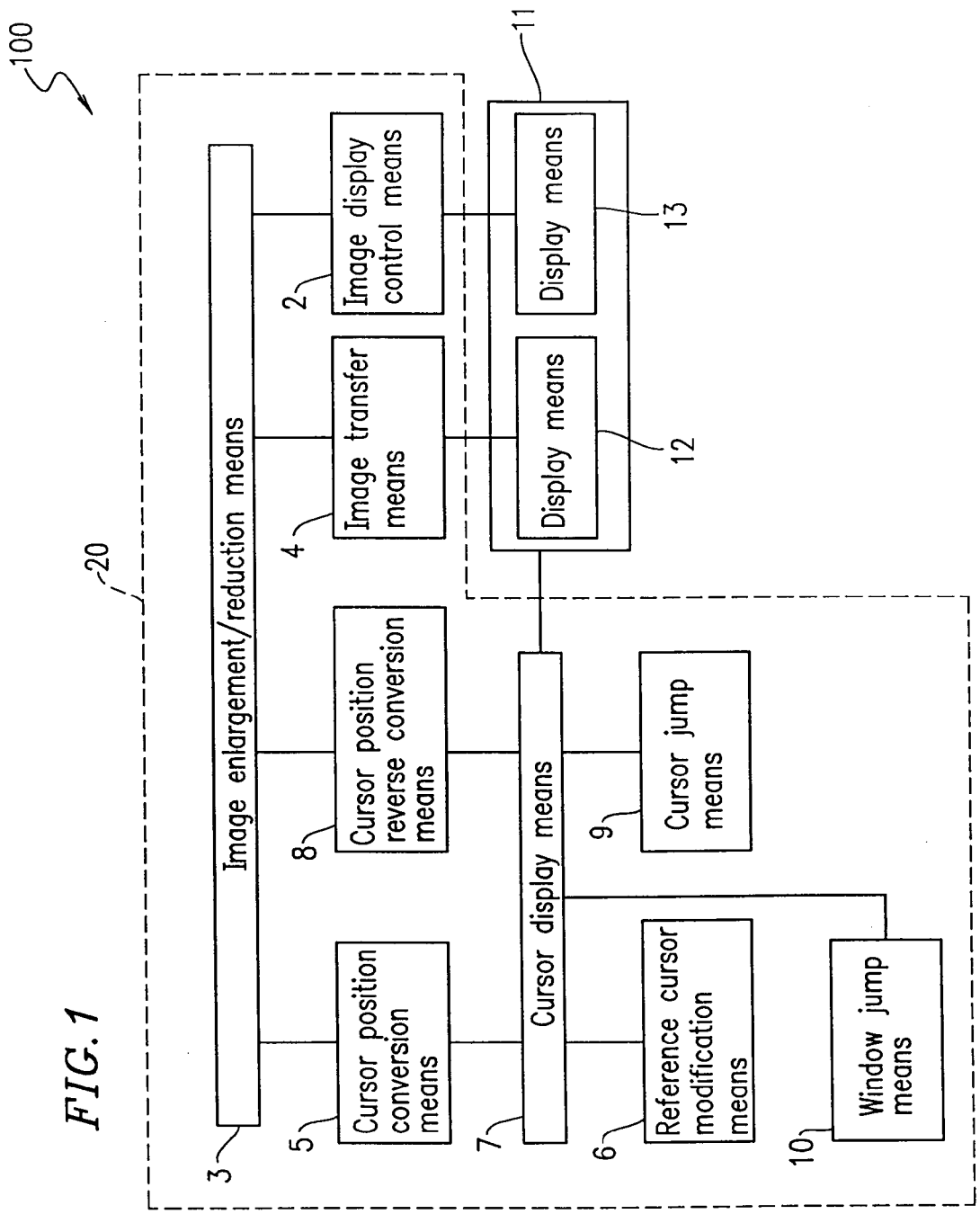
FIG. 1 is a block diagram illustrating the structure of a multi-display system 100 according to Example 1 of the present invention.

FIG. 1 is a block diagram illustrating the structure of a multi-display system 100 according to Example 1 of the present invention. As shown in FIG. 1, the multi-display system 100 includes a personal computer main body 20 and a group of display means 11. The group of display means 11 includes a first display means 12 and a second display means 13 which are coupled to the personal computer main body 20. Although two display means 12 and 13 are illustrated, the present invention is not limited to such structure. A number n of display means may be provided, where n is an integer equal to or greater than three.

As used herein, when an image is transferred or to be transferred from a display means to another display means in a multi-display system, the former display means will be referred to as the "source" display means, and the latter the "destination" display means.

The personal computer main body 20 includes: an image display control means 2 for splitting an image displayed on the source display means into a plurality of image blocks and for splitting a display region on a destination display means into a plurality of display blocks: an image enlargement/reduction means 3 for enlarging or reducing the plurality of image blocks as split by the image display control means 2; an image transfer means 4 for transferring the plurality of image blocks which have been enlarged or reduced by the image enlargement/reduction means 3 to the display blocks as split by the image display control means 2 at predetermined intervals; a cursor position conversion means 5 for performing coordinate conversion to convert the position of a mouse cursor which is displayed on the source display means to a position on the destination display means; a reference cursor modification means 6 for modifying the color and/or shape of the mouse cursor to be displayed on the destination display means; a cursor display means 7 for displaying the mouse cursor as modified by the reference cursor modification means 6 at a position on the destination display means as calculated through the coordinate conversion by the cursor position conversion means 5; a cursor position reverse conversion means 8 for performing reverse coordinate conversion to convert the position of a mouse cursor which is displayed on the destination display means to a position on the source display means; a cursor jump means 9 for moving the mouse cursor to a desired position; and a window jump means 10 for moving a window to a desired position.

FIG. 2 is a diagram illustrating a process of reducing and transferring (hereinafter referred to as a "reduction transfer") an image displayed on the source display means to a specific region on the destination display means. Referring to FIGS. 1 and 2, the group of display means 11 includes the first display means 12 and the second display means 13, as mentioned above. As shown in a display state 2A in FIG. 2, the entire display region on the second display means 13 spans a range defined as (0,0)–(199,99); and the entire display region on the first display means 12 spans a range defined as (200,0)–(399,99). The second display means 13 includes a reference region 144. The display region of the reference region 144 spans a range defined as (148,49)–(197,73).

Hereinafter, a reduction transfer process of reducing and transferring an image displayed on the first display means 12 (as the "source" display means) to the reference region 144 on the second display means 13 (as the "destination" display means) will be described.

In response to an image transfer process request, various management tables will be initialized as described below. As shown in FIG. 2, the image transfer means 4 generates a source block management table 107 by referring to a "source display means" field 102 and a "number of split blocks" field 104 which are set in a transfer management table 101, and initializes a transfer counter 161 to "1". In the exemplary case shown in FIG. 2, the source display means field 102 is set to "first display means", and the number of split blocks field 104 is set to "4". Therefore, the source block management table 107 is generated so that a "region of first image block" field 108 indicates a range defined as (200,0)–(249,99); a "region of second image block" field 109 indicates a range defined as (250,0)–(299,99); a "region of third image block" field 110 indicates a range defined as (300,0)–(349,99); and a "region of fourth image block" field 111 indicates a range defined as (350,0)–(399,99).

The image display control means 2 generates a destination block management table 133 by referring to a "destination display means" field 129 and a "number of split blocks" field 130 which are set in a display management table 128, and initializes a display counter 163 to "1". Since the destination display means field 129 is set to "second display means", and the number of split blocks field 130 is set to "4", the destination block management table 133 is generated so that a "region of first display block" field 134 indicates a range defined as (148,49)–(159,73); a "region of second display block" field 135 indicates a range defined as (160,49)–(171, 73); a "region of third display block" field 136 indicates a range defined as (172,49)–(183,73); and a "region of fourth display block" field 137 indicates a range defined as (184, 49)–(196,73).

Based on the source block management table 107 in the image transfer means 4 and the destination block management table 133 in the image display control means 2, the image enlargement/reduction means 3 sets height (S1V) 119 and width (S1H) 120 in a "source image" field 117 in an image size management table 116 to "100" and "200", respectively, and sets height (S2V) 121 and width (S2H) 122 in a "destination region" field 118 to "25" and "50", respectively. Formulas for calculating enlargement/reduction ratios 123 are provided which define an enlargement/reduction ratio (ZH) along the horizontal (H) direction 124 to be "ZH=S2H÷S1H", and an enlargement/reduction ratio (ZV) along the vertical (V) direction 125 to be "ZV=S2V÷S1V".

Once the various management tables are initialized as described above, the image transfer means 4 passes data representing the first to fourth image blocks (corresponding to the fields 108 to 111) of the first display means 12 as managed by the source block management table 107, to the image enlargement/reduction means 3, and updates the value of the transfer counter 161. If the value of the transfer counter 161 exceeds the number of split blocks 104, the value of the transfer counter 161 is reset to "1".

The image enlargement/reduction means 3 reduces the images to be displayed in the first to fourth image blocks (corresponding to the fields 108 to 111) which are passed from the image transfer means 4. The image display control means 2 transfers the images which have been reduced by the image enlargement/reduction means 3 to the first to fourth display blocks (corresponding to the fields 134 to 137) on the second display means 13 as managed by the destination block management table 133, and updates the value of the display counter 163. If the value of the display counter 163 exceeds the number of split blocks 130, the value of the display counter 163 is reset to "1", and after the lapse of a predetermined period of time, processing for a next image block is begun.

Referring to FIG. 2, a display state 2B represents a state in which images 149, 150, 151, and 152 are respectively displayed in the first image block 145, the second image block 146, the third image block 147, and the fourth image block 148 on the first (source) display means 12. A sequence 2C of display states illustrates a manner in which the image blocks 145, 146, 147, and 148 on the first (source) display means 12 are sequentially reduced and transferred to the first display block 153, the second display block 155, the third display block 158, and the fourth display block 160 in the reference region 144 on the second (destination) display means 13. The sequence 2C of display states include display states 2D, 2E, 2F, and 2G, which represent states of the reference region 144 after the image blocks 145, 146, 147, and 148 are reduced and transferred thereto, respectively. The images 149, 150, 151, and 152, which were originally displayed in the image blocks 145, 146, 147, and 148 on the first (source) display means 12, respectively, are displayed as reduced images 154, 156, 157, and 159 in the display blocks 153, 155, 158, and 160 in the reference region 144 on the second (destination) display means 13.

Figure 3:
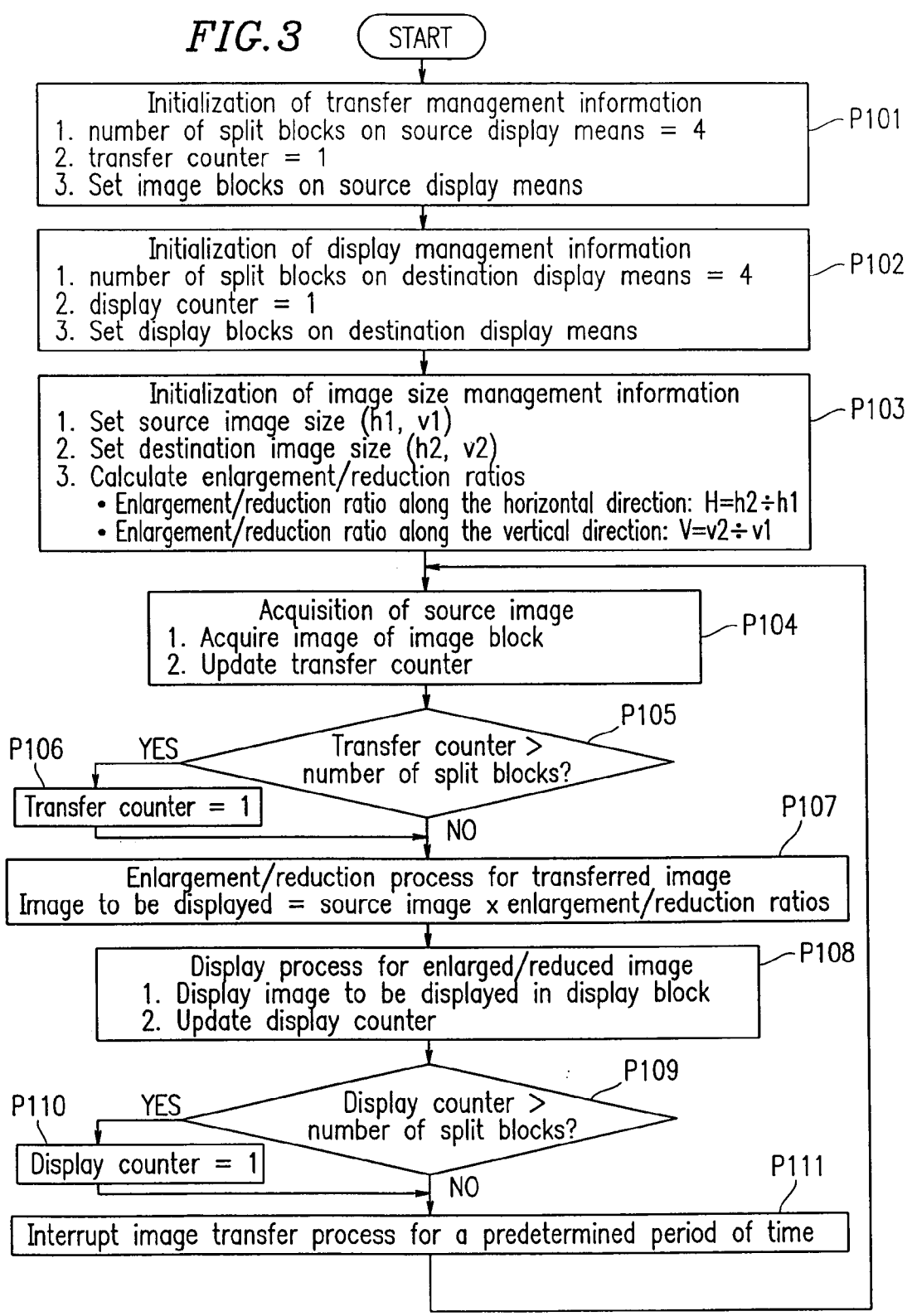
FIG. 3 is a flowchart illustrating an image transfer process according to Example 1 of the present invention.

FIG. 3 is a flowchart illustrating an image transfer process according to Example 1 of the present invention. At step P101, the number of split blocks 104 on the first (source) display means 12 is set to "4"; the transfer counter 161 is set to "1"; and the first to fourth image blocks 108, 109, 110, and 111 on the first (source) display means 13 are set. At step P102, the number of split blocks 130 on the second (destination) display means 13 is set to "4"; the display counter 163 is set to "1"; and the first to fourth display blocks 134, 135, 136, and 137 on the second (destination) display means 13 are set.

At step P103, respective enlargement/reduction ratios along the horizontal direction and the vertical direction are calculated based on the size of each image block on the first (source) display means 12 and the size of each image block on the second (destination) display means 13. At step P104, an image block corresponding to the value of the transfer counter 161 is acquired, and the value of the transfer counter 161 is updated. At step P105, it is determined whether or not the value of the transfer counter 161 has exceeded the number of split blocks 104 (i.e., whether or not the image transfer process has been performed down to the last image block). If the value of the transfer counter 161 has not exceeded the number of split blocks 104, the process proceeds to step P107. If the value of the transfer counter 161 has exceeded the number of split blocks 104, the process proceeds to step P106, where the value of the transfer counter 161 is set to "1", and thereafter the process proceeds to step P107.

At step P107, the image block on the first (source) display means 12 acquired at step P104 is enlarged or reduced in accordance with the enlargement/reduction ratios calculated at step P103, and an image to be displayed is generated. At step P108, the image to be displayed as generated at step P107 is displayed on a display block corresponding to the value of the display counter 163, and the value of the display counter 163 is updated. At step P109, it is determined whether or not the value of the display counter 163 has exceeded the number of split blocks 130 (i.e., whether or not the image display process has been performed down to the last display block). If the value of the display counter 163 has not exceeded the number of split blocks 130, the process proceeds to step P111. If the value of the display counter 163 has exceeded the number of split blocks 130, the process proceeds to step P110, where the value of the display counter 163 is set to "1", and thereafter the process proceeds to step P111. At step P111, the image transfer process is interrupted for a predetermined period of time so as to allow any other processes to be performed. After the lapse of the predetermined period of time, the process proceeds to step P104 so as to perform an image transfer process for a next image block.

EXAMPLE 2

Figure 4:
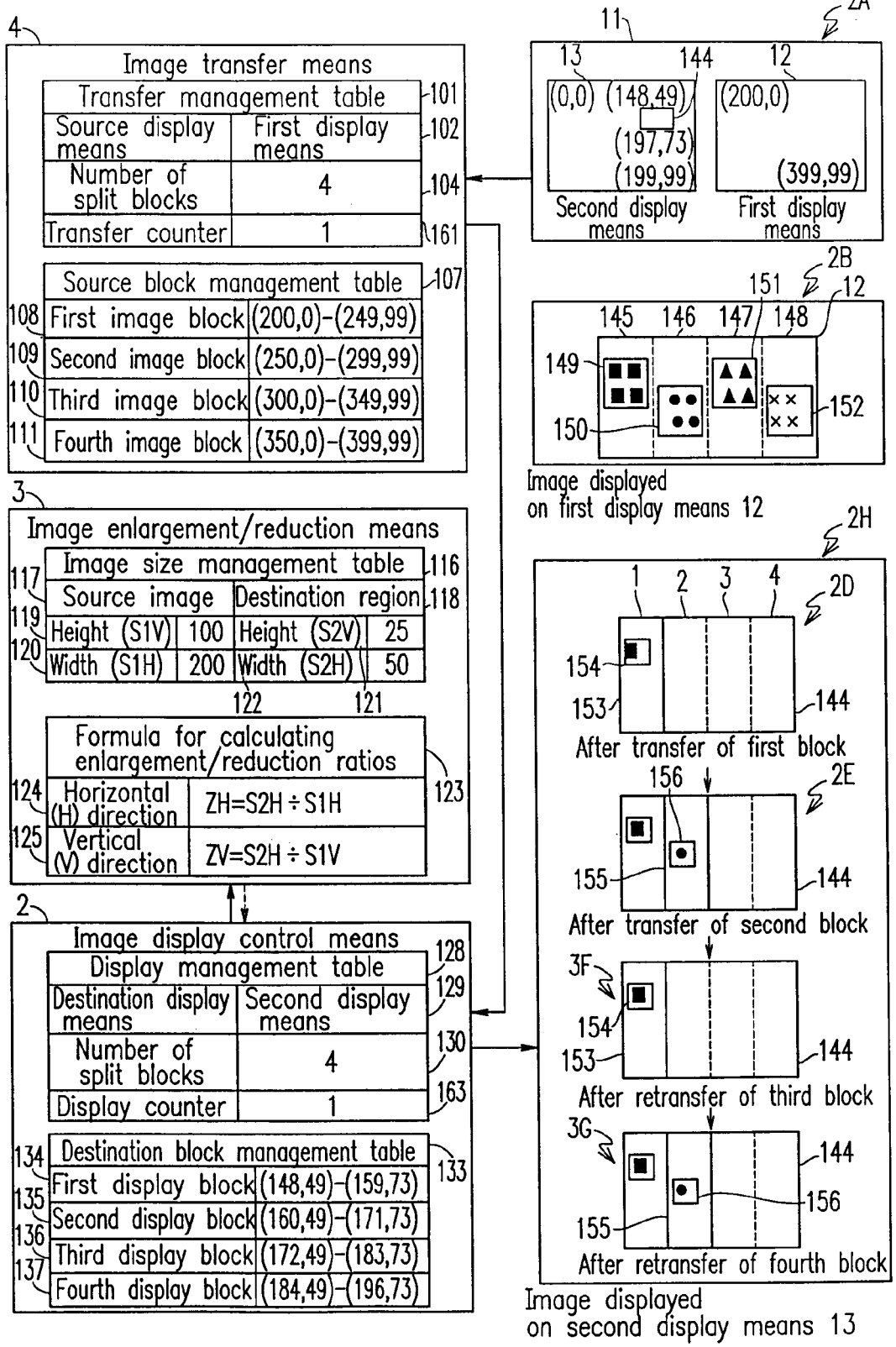
FIG. 4 is a diagram illustrating an image redisplay process according to Example 2 of the present invention, which is performed in response to a mouse event occurring during a reduction transfer of an image displayed on a source display means to a specific region on a destination display means.

According to Example 2 of the present invention, another type of operation of the multi-display system 100 according to Example 1 of the present invention (shown in FIG. 1) will be described. FIG. 4 is a diagram illustrating an image redisplay process according to Example 2 of the present invention, which is performed in response to a mouse event occurring during a reduction transfer of an image displayed on a source display means to a specific region on a destination display means. FIG. 5 is a flowchart illustrating an image redisplay process according to Example 2 of the present invention, which is performed in response to a mouse event during image transfer.

The component elements which are described in Example 1 with reference to FIGS. 2 and 3 are denoted by the same reference numerals as those used therein, and the detailed descriptions thereof are omitted.

Referring to FIGS. 1 and 4, the group of display means 11 includes the first display means 12 and the second display means 13, as mentioned above. As shown in a display state 2A in FIG. 4, the entire display region on the second display means 13 spans a range defined as (0,0)–(199,99); and the entire display region on the first display means 12 spans a range defined as (200,0)–(399,99). The second display means 13 includes a reference region 144. The display region of the reference region 144 spans a range defined as (148,49)–(197,73).

Hereinafter, an image redisplay process which is performed in response to a mouse event occurring during a reduction transfer of an image displayed on the first display means 12 (as the "source" display means) to the reference region 144 on the second display means 13 (as the "destination" display means) will be described.

Similarly to Example 1 (described with reference to FIG. 2), in response to an image transfer process request, various management tables will be initialized as described below. As shown in FIG. 4, the image transfer means 4 generates a source block management table 107 by referring to a "source display means" field 102 and a "number of split blocks" field 104 which are set in a transfer management table 101, and initializes a transfer counter 161 to "1". In the exemplary case shown in FIG. 4, the source display means field 102 is set to "first display means", and the number of split blocks field 104 is set to "4". Therefore, the source block management table 107 is generated so that a "region of first image block" field 108 indicates a range defined as (200,0)–(249, 99); a "region of second image block" field 109 indicates a range defined as (250,0)–(299,99); a "region of third image block" field 110 indicates a range defined as (300,0)–(349, 99); and a "region of fourth image block" field 111 indicates a range defined as (350,0)–(399,99).

The image display control means 2 generates a destination block management table 133 by referring to a "destination display means" field 129 and a "number of split blocks" field 130 which are set in a display management table 128, and initializes a display counter 163 to "1". Since the destination display means field 129 is set to "second display means", and the number of split blocks field 130 is set to "4", the destination block management table 133 is generated so that a "region of first display block" field 134 indicates a range defined as (148,49)–(159,73); a "region of second display block" field 135 indicates a range defined as (160,49)–(171, 73); a "region of third display block" field 136 indicates a range defined as (172,49)–(183,73); and a "region of fourth display block" field 137 indicates a range defined as (184, 49)–(196,73).

Based on the source block management table 107 in the image transfer means 4 and the destination block management table 133 in the image display control means 2, the image enlargement/reduction means 3 sets height (S1V) 119 and width (S1H) 120 in a "source image" field 117 in an image size management table 116 to "100" and "200", respectively, and sets height (S2V) 121 and width (S2H) 122 in a "destination region" field 118 to "25" and "50", respectively. Formulas for calculating enlargement/reduction ratios 123 are provided which define an enlargement/reduction ratio (ZH) along the horizontal (H) direction 124 to be "ZH=S2H÷S1H", and an enlargement/reduction ratio (ZV) along the vertical (V) direction 125 to be "ZV=S2V÷S1V".

Once the various management tables are initialized as described above, the image transfer means 4 passes data representing the first to fourth image blocks (corresponding to the fields 108 to 111) of the first display means 12 as managed by the source block management table 107, to the image enlargement/reduction means 3, and updates the value of the transfer counter 161. If the value of the transfer counter 161 exceeds the number of split blocks 104, the value of the transfer counter 161 is reset to "1".

The image enlargement/reduction means 3 reduces the images to be displayed in the first to fourth image blocks (corresponding to the fields 108 to 111) which are passed from the image transfer means 4. The image display control means 2 transfers the images which have been reduced by the image enlargement/reduction means 3 to the first to fourth display blocks (corresponding to the fields 134 to 137) on the second display means 13 as managed by the destination block management table 133, and updates the value of the display counter 163. If the value of the display counter 163 exceeds the number of split blocks 130, the value of the display counter 163 is reset to "1".

If a mouse event occurs during the image transfer, the values of the transfer counter 161 and the display counter 163 are reset to "1", and after the lapse of a predetermined period of time, processing is again begun from the first image block (corresponding to the field 108).

Referring to FIG. 4, a display state 2B represents a state in which images 149, 150, 151, and 152 are respectively displayed in the first image block 145, the second image block 146, the third image block 147, and the fourth image block 148 on the first (source) display means 12. A sequence 2H of display states illustrates a manner in which the image blocks 145 and 146 on the first (source) display means 12 are sequentially reduced and transferred to the first display block 153 and the second display block 155 in the reference region 144 on the second (destination) display means 13.

The sequence 2H of display states include display states 2D, 2E, 3F, and 3G. The display states 2D and 2E represent states of the reference region 144 after the image blocks 145 and 146 are reduced and transferred thereto, respectively.

The display states 3F and 3G represent states of the reference region 144 after the image blocks 145 and 146 are again transferred thereto, respectively, in response to a mouse event occurring during the transfer of the image block 147. The images 145 and 146 are displayed as reduced images 153 and 155, respectively.

Now, the image transfer process according to Example 2 of the present invention will be described with reference to FIG. 5. At step P101, the number of split blocks 104 on the first (source) display means 12 is set to "4"; the transfer counter 161 is set to "1" and the first to fourth image blocks 108, 109, 110, and 111 on the first (source) display means 13 are set. At step P102, the number of split blocks 130 on the second (destination) display means 13 is set to "4"; the display counter 163 is set to "1"; and the first to fourth display blocks 134, 135, 136, and 137 on the second (destination) display means 13 are set.

At step P103, respective enlargement/reduction ratios along the horizontal direction and the vertical direction are calculated based on the size of each image block on the first (source) display means 12 and the size of each image block on the second (destination) display means 13. At step P104, an image block corresponding to the value of the transfer counter 161 is acquired, and the value of the transfer counter 161 is updated. At step P105, it is determined whether or not the value of the transfer counter 161 has exceeded the number of split blocks 104 (i.e., whether or not the image transfer process has been performed down to the last image block). If the value of the transfer counter 161 has not exceeded the number of split blocks 104, the process proceeds to step P107. If the value of the transfer counter 161 has exceeded the number of split blocks 104, the process proceeds to step P106, where the value of the transfer counter 161 is set to "1", and thereafter the process proceeds to step P107.

At step P107, the image block on the first (source) display means 12 acquired at step P104 is enlarged or reduced in accordance with the enlargement/reduction ratios calculated at step P103, and an image to be displayed is generated.

At step P108, the image to be displayed as generated at step P107 is displayed on a display block corresponding to the value of the display counter 163, and the value of the display counter 163 is updated. At step P109, it is determined whether or not the value of the display counter 163 has exceeded the number of split blocks 130 (i.e., whether or not the image display process has been performed down to the last display block). If the value of the display counter 163 has not exceeded the number of split blocks 130, the process proceeds to step P111. If the value of the display counter 163 has exceeded the number of split blocks 130, the process proceeds to step P110, where the value of the display counter 163 is set to "1", and thereafter the process proceeds to step P111. At step P111, the image transfer process is interrupted for a predetermined period of time so as to allow any other processes to be performed. After the lapse of the predetermined period of time, the process proceeds to step P212, where a mouse event is acquired.

At step P213, it is determined whether or not a mouse event has occurred. If no mouse event has occurred, the process proceeds to step P104 so as to perform an image transfer process for a next image block. If a mouse event has occurred, the process proceeds to step P214, where the values of the transfer counter 261 and the display counter 263 are set to "1". Thereafter, the process proceeds to step P104 so as to again perform an image transfer process from the first image block.

EXAMPLE 3

According to Example 3 of the present invention, yet another type of operation of the multi-display system 100 according to Example 1 of the present invention (shown in FIG. 1) will be described. FIG. 6 is a diagram illustrating a process of displaying a mouse cursor image during image transfer according to Example 3 of the present invention. The component elements which are described in Example 1 with reference to FIG. 2 are denoted by the same reference numerals as those used therein, and the detailed descriptions thereof are omitted.

Referring to FIGS. 1 and 6, the group of display means 11 includes the first display means 12 and the second display means 13, as mentioned above. As shown in a display state 4A in FIG. 6, the entire display region on the second display means 13 spans a range defined as (0,0)–(199,99); and the entire display region on the first display means 12 spans a range defined as (200,0)–(399,99). The second display means 13 includes a reference region 144. The display region of the reference region 144 spans a range defined as (148,49)–(197,73).

Hereinafter, a transfer process for a mouse cursor image which is performed when an image displayed on the first display means 12 is reduced and transferred to the reference region 144 on the second display means 13 will be described.

The initialization for the various management tables in the image transfer means 4, the image display control means 2, and the image enlargement/reduction means 3 is performed in a manner similar to Example 1, and the descriptions thereof are omitted.

The cursor position conversion means 5 sets the enlargement/reduction ratios obtained from the image enlargement/reduction means 3 as enlargement/reduction ratios 304 in a cursor coordinate conversion management table 301, sets the coordinates of the upper left corner of the reference region 144 as base coordinates 303 in the cursor coordinate conversion management table 301, and sets "X=Xb+(Xn−(X coordinate of the upper left corner of the first display means 12))×ZH" along the H direction (309), and "Y=Yb+(Yn−(Y coordinate of the upper left corner of the first display means 12))×ZV" along the V direction (310), as coordinate conversion formulas 308.

The cursor display means 7 initializes a "displaying shape" field 315 in cursor displaying information 313 as shown in FIG. 6. Once the various management tables are initialized, the cursor display means 7 acquires the mouse cursor coordinates at predetermined time intervals and passes the mouse cursor coordinates to the cursor position conversion means 5. The cursor position conversion means 5 stores the mouse cursor coordinates which were passed from the cursor display means 7 as cursor coordinates 302 in the cursor coordinate conversion management table 301, and passes a set of coordinates, which are obtained through coordinate conversion along the horizontal direction and the vertical direction in accordance with the coordinate conversion formulas 308, to the cursor display means 7. The cursor display means 7 stores the set of coordinates which were subjected to coordinate conversion and passed from the cursor position conversion means 5 as displaying position 314 in the cursor displaying information 313. The cursor display means 7 displays a reference cursor based on the displaying position 314 and the displaying shape 315 as stored in the cursor displaying information 313.

A display state 4B represents a state of the first (source) display means 12 in which the mouse cursor is moved from coordinates 321 to coordinates 322 and to coordinates 323. A sequence of display states 4C illustrates changes in the manner in which the reference cursor is displayed in the reference region 144 in response to mouse cursor movements on the first display means 12 during image transfer. The sequence of display states 4C includes display states 4D, 4E, and 4D. The display state 4D represents a reference cursor (326) being displayed in the reference region 144 as soon as image transfer to a first display block 324 occurs. The display states 4E and 4F represent, respectively, the reference cursor (328 and 330) being sequentially displayed in the reference region 144 while the mouse cursor moves on the first display means 12, the displaying of the reference cursors 328 and 330 not occurring in synchronization with the image transfer to the second display block 327.

The reference cursor is displayed at a position in the reference region 144 corresponding to the position of the mouse cursor on the first display means 12. Thus, based on the position of the reference mouse cursor in the reference region 144, an operator can recognize the position of the mouse cursor on the first display means 12.

The multi-display system according to the present example provides a particularly outstanding effect when the first and second display means 12 and 13 are disposed so that the operator facing the second display means 13 cannot see a cursor displayed on the first display means 12, e.g., in a "back to back" placement. Note that the first display means 12 and the second display means 13 may be disposed so as to have any angle therebetween, without limitation.

FIG. 7 is a flowchart illustrating a display process for a mouse cursor image during image transfer according to Example 3 of the present invention.

At step P301, the base coordinates 303 and the enlargement/reduction ratios 304 in the cursor coordinate conversion management table 301 are set. At step P302, the displaying shape 315 in the cursor displaying information 313 is set. At step P303, the mouse cursor coordinates on the first display means 12 are acquired. At step P304, it is determined whether or not the mouse cursor on the first display means 12 has moved. If the mouse cursor on the first display means 12 has not moved, the process proceeds to step P303. If the mouse cursor on the first display means 12 has moved, the process proceeds to step P305. At step P305, based on the base coordinates 303 and the enlargement/reduction ratios 304 as set in the cursor coordinate conversion management table 301 at step P301, the mouse cursor coordinates acquired at step P303 are converted. At step P306, a reference cursor having the displaying shape 315 as set at step P302 is displayed at the coordinates as converted at step P305, and the process returns to step P303.

EXAMPLE 4

According to Example 4 of the present invention, yet another type of operation of the multi-display system 100 according to Example 1 of the present invention (shown in FIG. 1) will be described. FIG. 8 is a diagram illustrating a process of displaying a mouse cursor image on a destination display means according to Example 4 of the present invention. The component elements which are described in Example 1 with reference to FIG. 2 are denoted by the same reference numerals as those used therein, and the detailed descriptions thereof are omitted.

Referring to FIGS. 1 and 8, the group of display means 11 includes the first display means 12 and the second display means 13, as mentioned above. As shown in a display state 4A in FIG. 8, the entire display region on the second display means 13 spans a range defined as (0,0)–(199,99); and the entire display region on the first display means 12 spans a range defined as (200,0)–(399,99). The second display means 13 includes a reference region 144. The display region of the reference region 144 spans a range defined as (148,49)–(197,73).

Hereinafter, a transfer process for a mouse cursor image which is performed when an image displayed on the first display means 12 is reduced and transferred to the reference region 144 on the second display means 13 will be described.

The initialization for the various management tables in the image transfer means 4, the image display control means 2, and the image enlargement/reduction means 3 is performed in a manner similar to Example 1, and the descriptions thereof are omitted.

The cursor position conversion means 5 sets the enlargement/reduction ratios obtained from the image enlargement/reduction means 3 as enlargement/reduction ratios 304 in a cursor coordinate conversion management table 301, sets the coordinates of the upper left corner of the reference region 144 as base coordinates 303 in the cursor coordinate conversion management table 301, and sets "X=Xb+(Xn−(X coordinate of the upper left corner of the first display means 12))×ZH" along the H direction (309), and "Y=Yb+(Yn−(Y coordinate of the upper left corner of the first display means 12))×ZV" along the V direction (310), as coordinate conversion formulas 308.

The reference cursor modification means 6 sets information 435 representing various cursor shapes and colors in a cursor shape table 433 along with shape numbers 434. According to the present example, "2" is set as an initial value for the cursor shape number.

The cursor display means 7 sets, as displaying shape 315 in cursor displaying information 313, a cursor shape corresponding to the shape number "2" for the cursor to be displayed as set by the reference cursor modification means 6. Once the various management tables are initialized, the cursor display means 7 acquires the mouse cursor coordinates at predetermined time intervals and passes the mouse cursor coordinates to the cursor position conversion means 5. The cursor position conversion means 5 stores the mouse cursor coordinates which were passed from the cursor display means 7 as cursor coordinates 302 in the cursor coordinate conversion management table 301, and passes a set of coordinates, which are obtained through coordinate conversion along the horizontal direction and the vertical direction in accordance with the coordinate conversion formulas 308, to the cursor display means 7. The cursor display means 7 stores the set of coordinates which were subjected to coordinate conversion and passed from the cursor position conversion means 5 as displaying position 314 in the cursor displaying information 313. The cursor display means 7 displays a reference cursor based on the displaying position 314 and the displaying shape 315 as stored in the cursor displaying information 313.

A display state 4B represents a state of the first (source) display means 12 in which the mouse cursor is moved from coordinates 321 to coordinates 322 and to coordinates 323. A sequence of display states 5C illustrates changes in the manner in which the reference mouse cursor is displayed in the reference region 144 in response to mouse cursor movements on the first display means 12 during image transfer. The sequence of display states 5C includes display states 5D, 5E, and SD. The display state 5D represents a reference cursor (426) being displayed in the reference region 144 as soon as image transfer to a first display block 324 occurs. The display states 5E and 5F represent, respectively, the reference cursor (428 and 430) being sequentially displayed in the reference region 144 while the mouse cursor moves on the first display means 12, the displaying of the reference cursors 428 and 430 not occurring in synchronization with the image transfer to the second display block 327.

Thus, the shape and/or color of the mouse cursor image (hereinafter referred to as the "true cursor") displayed on the first (source) display means 12 can be differentiated from the shape and/or color of the reference cursor displayed in the reference region 144 on the second (destination) display means 13. As a result, the true cursor, which is responsible for generating a mouse event, can be visually distinguished from the reference cursor, which moves in accordance with the movement of the true cursor.

FIG. 9 is a flowchart illustrating a display process for a reference mouse cursor according to Example 4 of the present invention.

At step P301, the base coordinates 303 and the enlargement/reduction ratios 304 in the cursor coordinate conversion management table 301 are set. At step P402, the shape numbers 434 and the cursor shapes 435 are set in the cursor shape table 433, and a shape number 431 for the reference cursor to be displayed in the reference region 144 is set. At step P403, the cursor shape 435 corresponding to the shape number 431 for the reference cursor to be displayed in the reference region 144 as set in step 402 is set in the displaying shape 315 in the cursor displaying information 313. At step P303, the mouse cursor coordinates on the first display means 12 are acquired. At step P304, it is determined whether or not the mouse cursor on the first display means 12 has moved. If the mouse cursor on the first display means 12 has not moved, the process proceeds to step P303. If the mouse cursor on the first display means 12 has moved, the process proceeds to step P305. At step P305, based on the base coordinates 303 and the enlargement/reduction ratios 304 as set in the cursor coordinate conversion management table 301 at step P301, the mouse cursor coordinates acquired at step P303 are converted. At step P407, a reference cursor having the displaying shape 315 as set at step P403 is displayed at the coordinates as converted at step P305, and the process returns to step P303.

EXAMPLE 5

According to Example 5 of the present invention, yet another type of operation of the multi-display system 100 according to Example 1 of the present invention (shown in FIG. 1) will be described. FIG. 10 is a diagram illustrating a process of moving a mouse cursor between display means according to Example 5 of the present invention. The component elements which are described in Example 1 with reference to FIG. 2 are denoted by the same reference numerals as those used therein, and the detailed descriptions thereof are omitted.

Referring to FIGS. 1 and 10, the group of display means 11 includes the first display means 12 and the second display means 13, as mentioned above. As shown in a display state 6A in FIG. 10, the entire display region on the second display means 13 spans a range defined as (0,0)–(199,99); and the entire display region on the first display means 12 spans a range defined as (200,0)–(399,99). The second display means 13 includes a reference region 144. The display region of the reference region 144 spans a range defined as (148,49)–(197,73).

Hereinafter, a moving process for a mouse cursor utilizing a reduced image displayed in the reference region 144 on the second display means 13 according to Example 5 of the present invention will be described. The reduced image is a reduced version of an image displayed on the first display means 12.

In response to a request for reduced displaying, which requests an image displayed on the first display means 12 to be displayed on the second display means 13 in a reduced size, the various management tables are initialized.

The initialization for the various management tables in the image transfer means 4, the image display control means 2, the image enlargement/reduction means 3, the cursor position conversion means 5, the reference cursor modification means 6, and the cursor display means 7 is performed in a manner similar to Example 4, and the descriptions thereof are omitted.

The cursor position reverse conversion means 8 sets the enlargement/reduction ratios obtained from the image enlargement/reduction means 3 as enlargement/reduction ratios 504 in a cursor coordinate reverse conversion management table 501, sets the coordinates of the upper left corner of the reference region 144 as base coordinates 503 in the cursor coordinate reverse conversion management table 501, and sets "X=200(X coordinate of the upper left corner of the first display means 12)+(Xn−Xb)÷ZH" along the H direction (509), and "Y=0(Y coordinate of the upper left corner of the first display means 12)+(Yn−Yb)÷ZV" along the V direction (510), as coordinate conversion formulas 508.

Once the various management tables are initialized, the cursor display means 7 acquires the mouse cursor coordinates at predetermined time intervals and passes the mouse cursor coordinates to the cursor position reverse conversion means 8.

The cursor position reverse conversion means 8 stores the mouse cursor coordinates which were passed from the cursor display means 7 as cursor coordinates 502 in the cursor coordinate reverse conversion management table 501, and if the received coordinates are contained within the reference region 144 on the second display means 13, passes a set of coordinates, which are obtained through coordinate conversion along the horizontal direction and the vertical direction in accordance with the coordinate conversion formulas 508, to the cursor display means 7.

The cursor display means 7 passes the converted coordinates which were passed from the cursor position reverse conversion means 8 to the cursor jump means 9.

The cursor jump means 9 stores the converted coordinates which were passed from the cursor display means 7 as jump position 515 in cursor jump information 514.

The cursor jump means 9 determines whether or not a click has occurred with the mouse cursor in the reference region 144 on the second display means 13. If it is determined that a click has occurred, the cursor jump means 9 instructs the cursor display means 7 to jump the mouse cursor to a position on the first display means 12 as represented by the jump position 515 in the cursor jump information 514. In response, the cursor display means 7 causes the mouse cursor to jump to the position on the first display means 12 as instructed by the cursor jump means 9, while also changing the shape of the cursor from that of the cursor displayed in the reference region 144 on the second display means 13.

A display state 6B represents a mouse cursor 526 having been moved to a position 521 in the reference region 144 on the second display means 13 and then clicked. A display state 6C represents a state in which the mouse cursor 526 has been jumped to a position 523 on the first display means 12 corresponding to the position 521 in the reference region 144. A display state 6D represents a reference cursor 527 being displayed at a position 524 in the reference region 144 on the second display means 13, which corresponds to the position 523 of the mouse cursor 526 displayed on the first display means 12, the reference cursor 527 being displayed in the shape stored in the reference cursor modification means 6.

FIG. 11 is a flowchart illustrating a process of moving a mouse cursor between display means according to Example 5 of the present invention.

At step P501, the base coordinates 503 and the enlargement/reduction ratios 504 in the cursor coordinate reverse conversion management table 501 and the coordinate conversion formulas 508 along the H direction (509) and the V direction (511) are set. At step P502, it is determined whether or not a mouse click has occurred. If a mouse click has occurred, the process proceeds to step P503; otherwise, the process proceeds to step P502. At step P503, it is determined whether or not the position of the mouse cursor is in the reference region 144. If the position of the mouse cursor is in the reference region 144, the process proceeds to step P504; otherwise, the process proceeds to step P502. At step P504, the mouse cursor coordinates at which the mouse click has occurred are converted in accordance with the coordinate conversion formulas 508 in the cursor position reverse conversion means 8, and the process proceeds to step P505. At step P505, the mouse cursor is jumped to the coordinates (on the first display means 12) obtained from the conversion performed at step P504.

EXAMPLE 6

According to Example 6 of the present invention, yet another type of operation of the multi-display system 100 according to Example 1 of the present invention (shown in FIG. 1) will be described. FIG. 12 is a diagram illustrating a process of moving a mouse cursor between display means according to Example 6 of the present invention. The component elements which are described in Example 1 with reference to FIG. 2 are denoted by the same reference numerals as those used therein, and the detailed descriptions thereof are omitted.

Referring to FIGS. 1 and 12, the group of display means 11 includes the first display means 12 and the second display means 13, as mentioned above. As shown in a display state 6A in FIG. 12, the entire display region on the second display means 13 spans a range defined as (0,0)–(199,99); and the entire display region on the first display means 12 spans a range defined as (200,0)–(399,99). The second display means 13 includes a reference region 144. The display region of the reference region 144 spans a range defined as (148,49)–(197,73).

Hereinafter, a moving process for a window utilizing a reduced image displayed in the reference region 144 on the second display means 13 according to Example 5 of the present invention will be described. The reduced image is a reduced version of an image displayed on the first display means 12.

In response to a request for reduced displaying, which requests an image displayed on the first display means 12 to be displayed on the second display means 13 in a reduced size, the various management tables are initialized.

The initialization for the various management tables in the image transfer means 4, the image display control means 2, the image enlargement/reduction means 3, the cursor position conversion means 5, the reference cursor modification means 6, and the cursor display means 7 is performed in a manner similar to Example 4, and the descriptions thereof are omitted.

Referring to FIG. 12, once the various management tables are initialized, the cursor display means 7 acquires the coordinates of a mouse cursor 616 at predetermined time intervals and passes the mouse cursor coordinates to the cursor position reverse conversion means 8.

The cursor position reverse conversion means 8 stores the coordinates of the mouse cursor 616 which were passed from the cursor display means 7, and if the received coordinates are contained within the reference region 144 on the second display means 13, passes a set of coordinates, which are obtained through coordinate conversion along the horizontal direction and the vertical direction, to the cursor display means 7.

The cursor display means 7 controls the cursor jump means 9 so as to cause the mouse cursor 616 to jump to a position 617 on the first display means 12, and instead displays a reference cursor 621, which has a different shape from that of the mouse cursor 616, at the position where the mouse cursor 616 originally was. The cursor display means 7 passes the converted coordinates which were passed from the cursor position reverse conversion means 8 to the window jump means 10.

The window jump means 10 determines whether or not the mouse cursor has been "dragged" (i.e., the mouse cursor has been moved with a left button of the mouse being kept down) in a window 613 on the second display means 13. If it is determined that the mouse cursor has been dragged, the window jump means 10 stores a window ID 607, identifying the window 613 to be moved, in window jump information 604. The window jump means 10 stores the converted coordinates which were passed from the cursor display means 7 as jump position 608. The window jump means 10 determines whether or not the mouse cursor has been "dropped" (i.e., the left button of the mouse has been let up). If it is determined that the mouse cursor has been dropped, the window jump means 10 causes the window 613 to jump in accordance with the converted coordinates stored as the jump position 608.

A display state 7B represents the mouse cursor 616 being dragged at a position 614 in the window 613 displayed on the second display means 13, then moved from the position 614 to a position 615 in the reference region 144, and finally dropped. The window 613 is also moved along with the dragged mouse cursor 616.

A display state 7C represents a state in which the mouse cursor 616, having been moved from the position 614 to the position 615 in the reference region 144, has jumped from the position 615 in the reference region 144 to a position 617 on the first display means 12 corresponding to the position 615. The window 613 is also jumped along with the dragged mouse cursor 616.

A display state 7D represents the reference cursor 621 being displayed at the position 615 in the reference region 144 where the mouse cursor 616 originally was.

Thus, according to the present invention, there is provided: a multi-display system which, when two users are seated across from each other with their respective display means placed "back to back" (i.e., so that each user can properly see their own display means), allows a user facing one of the display means to accurately recognize the position of the mouse cursor which is displayed on the other display means; and a cursor controlling method therefor.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A multi-display system comprising:
    first display means and second display means, wherein a cursor is displayed at a first position on the first display means;
    cursor position conversion means for converting the first position on the first display means at which the cursor is displayed to a second position on the second display means; and
    cursor display means for displaying a reference cursor at the second position on the second display means as converted by the cursor position conversion means,
    wherein the first position is converted to the second position by the cursor position conversion means in such a manner that the reference cursor displayed at the second position on the second display means uniquely identifies the first position at which the cursor is displayed on the first display means.

2. A multi-display system according to claim 1, wherein:
    the second display means comprises a reference region containing the second position at which the reference cursor is displayed; and
    the first position is converted to the second position by the cursor position conversion means in such a manner that the second position in the reference region corresponds to the first position on the first display means.

3. A multi-display system according to claim 1, wherein an angle between the first display means and the second display means is adjustable to any value.

4. A multi-display system according to claim 1, wherein the first display means and second display means are placed back-to-back.

5. A multi-display system according to claim 1, further comprising reference cursor modification means for modifying at least one of color and shape of the reference cursor,
    wherein the cursor display means displays the reference cursor at the second position on the second display means in accordance with the at least one of color and shape as modified by the reference cursor modification means.

6. A multi-display system comprising:
    first display means and second display means, wherein the second display means includes a reference region in which a cursor is displayed;
    cursor position reverse conversion means for converting a first position in the reference region at which the cursor is displayed to a second position on the first display means; and
    cursor jump means for causing the cursor displayed in the reference region to jump to the second position on the first display means as converted by the cursor position reverse conversion means.

7. A multi-display system according to claim 6, further comprising cursor display means for displaying a reference cursor at the first position after the cursor displayed in the reference region has jumped to the second position on the first display means.

8. A multi-display system according to claim 6, wherein a window is displayed in the reference region, the multi-display system further comprising:
    window jump means for causing the window displayed in the reference region to jump to the second position on the first display means as converted by the cursor position reverse conversion means.

9. A cursor controlling method for a multi-display system comprising:
    a first step of displaying a cursor at a first position on the first display means;
    a second step of converting the first position on the first display means at which the cursor is displayed to a second position on the second display means; and
    a third step of displaying a reference cursor at the second position on the second display means as converted by the second step,
    wherein the second step comprises converting the first position to the second position in such a manner that the reference cursor displayed at the second position on the second display means uniquely identifies the first position at which the cursor is displayed on the first display means.

10. A method according to claim 9, wherein:
    the second display means comprises a reference region containing the second position at which the reference cursor is displayed; and
    the second step comprises converting the first position to the second position in such a manner that the second position in the reference region corresponds to the first position on the first display means.

11. A method according to claim 9, wherein an angle between the first display means and the second display means is adjustable to any value.

12. A method according to claim 9, wherein the first display means and second display means are placed back-to-back.

13. A method according to claim 9, further comprising a fourth step of modifying at least one of color and shape of the reference cursor,
    wherein the third step comprises displaying the reference cursor at the second position on the second display means in accordance with the at least one of color and shape as modified by the fourth step.

14. A cursor controlling method for a multi-display system comprising first display means and second display means, wherein the second display means includes a reference region in which a cursor is displayed, the method comprising:
    a first step of converting a first position in the reference region at which the cursor is displayed to a second position on the first display means; and
    a second step of causing the cursor displayed in the reference region to jump to the second position on the first display means as converted by the first step.

15. A method according to claim 14, further comprising a third step of displaying a reference cursor at the first position after the cursor displayed in the reference region has jumped to the second position on the first display means.

16. A method according to claim 14, wherein a window is displayed in the reference region, the method further comprising:

a third step of causing the window displayed in the reference region to jump to the second position on the first display means as converted by the first step.

* * * * *